US012755326B2

(12) United States Patent
Ghoshdastider et al.

(10) Patent No.: US 12,755,326 B2
(45) Date of Patent: Oct. 6, 2026

(54) RECOMMENDING OPTIMUM CONFIGURATIONS IN INDUSTRIAL CONTROL SYSTEMS FOR IMPROVING QUALITY OF PRODUCT

(71) Applicant: Tata Consultancy Services Limited, Mumbai (IN)

(72) Inventors: Mainak Ghoshdastider, Kolkata (IN); Abhisek Das, Kolkata (IN); Dhiman Chattopadhyay, Kolkata (IN); Sangram Dasharath Gaikwad, Pune (IN); Tania Ghosh, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 19/039,020

(22) Filed: Jan. 28, 2025

(65) Prior Publication Data

US 2025/0259249 A1 Aug. 14, 2025

(30) Foreign Application Priority Data

Feb. 9, 2024 (IN) ............................. 202421008939

(51) Int. Cl.
*G06Q 50/04* (2012.01)
*G06N 3/0499* (2023.01)
(Continued)

(52) U.S. Cl.
CPC ........... *G06Q 50/04* (2013.01); *G06N 3/0499* (2023.01); *G06N 3/084* (2013.01); *G06Q 10/06395* (2013.01)

(58) Field of Classification Search
None
See application file for complete search history.

(56) References Cited

U.S. PATENT DOCUMENTS 11,630,450 B2 * 4/2023 Tokuno .............. G05B 23/0262 702/81
12,443,173 B2 * 10/2025 deFreese .......... G05B 19/41875
(Continued)

FOREIGN PATENT DOCUMENTS

| | | | |
|---|---|---|---|
| CN | 113934185 | A | 1/2022 |
| EP | 3497526 | A4 | 3/2024 |
| IN | 202221057975 | | 7/2024 |

OTHER PUBLICATIONS

J. Chao, W. Ratanasuwan and S. Tsujii, "How to find global minima in finite times of search for multilayer perceptrons training," [Proceedings] 1991 IEEE International Joint Conference on Neural Networks, Singapore, 1991, pp. 1079-1084 vol.2, doi: 10.1109/IJCNN.1991.170541 (Year: 1991).*
(Continued)

*Primary Examiner* — Mehmet Yesildag
(74) *Attorney, Agent, or Firm* — Finnegan, Henderson, Farabow, Garrett & Dunner LLP

(57) ABSTRACT

The embodiments of present disclosure herein address unresolved problem of getting optimum quality of product while changing operating conditions and raw material frequently in an industrial manufacturing process. The disclosure herein generally relates to a deep learning based approach for a multi-objective constrained optimization. Embodiments provide a method and system for recommending optimum configurations in industrial control systems for improving quality of product. The system is configured to automate improvement over existing golden batch with a data driven approach and replace need of random experimentation with very minimal systematic experiments. The system ensures that no constraint violations are made, and the system remains stable even when data is noisy. Further, the system recommends values of parameters so that improvement in quality is achieved. The changes in param-
(Continued)

100 eter value should be gradual even if the historical data received from feedback is noisy.

15 Claims, 9 Drawing Sheets

(51) Int. Cl.

| | |
|---|---|
| ***G06N 3/084*** | (2023.01) |
| ***G06Q 10/0639*** | (2023.01) |

(56) References Cited

U.S. PATENT DOCUMENTS

| | | | | |
|---|---|---|---|---|
| 2019/0265686 | A1* | 8/2019 | Obata | G05B 19/4188 |
| 2022/0035348 | A1* | 2/2022 | Ma | G05B 13/048 |
| 2022/0147871 | A1* | 5/2022 | Frikha | G05B 19/41865 |

OTHER PUBLICATIONS

Author: Jen S. Shang, Shanling Li, Pandu Tadikamalla Title: Operational design of a supply chain system using the Taguchi method, response surface methodology, simulation, and optimization Title of the item: International Journal of Production Research Date: Sep. 2004.

* cited by examiner

500

700

RECOMMENDING OPTIMUM CONFIGURATIONS IN INDUSTRIAL CONTROL SYSTEMS FOR IMPROVING QUALITY OF PRODUCT

PRIORITY CLAIM

This U.S. patent application claims priority under 35 U.S.C. § 119 to Indian Application number 202421008939, filed on Feb. 9, 2024. The entire content of the abovementioned application is incorporated herein by reference.

TECHNICAL FIELD

The disclosure herein generally relates to a deep learning-based approach for a multi-objective constrained optimization, and, more particularly, to a method and system for recommending optimum configurations in industrial control systems for improving quality of product.

BACKGROUND

In industrial manufacturing, very common problem is that the operating conditions (e.g., Ambient Temperature) and raw material quality of a product get changed frequently. However, even under such changing environments industries would like to improve the quality of the product beyond historically observed best without violating constraints set by manufacturer or government. A batch that produces optimum quality of product is commonly known as the golden Batch. It is a huge challenge to improve upon or to consistently produce golden batches specially under changing environment without violating the constraints when historical data is noisy.

Existing techniques either perform random experiments and find out initial settings manually or depends on domain expert to define process parameters. The existing techniques like Bayesian optimization do not work with multiple process parameters of quality and improvement if quality is not consistent over successive batches. The existing techniques struggle if constraints are imposed by the manufacturer or the government. Further, existing gradient-based techniques do not perform efficiently if the requirement is to improve the product quality beyond historical data. Also, noisy data is a huge challenge for any of the existing techniques.

SUMMARY

Embodiments of the present disclosure present technological improvements as solutions to one or more of the above-mentioned technical problems recognized by the inventors in conventional systems. For example, in one embodiment, a method to recommend optimum configurations in industrial control systems for improving quality of product is provided. The processor-implemented method includes receiving, via an input/output interface, a historical batch data of an industrial manufacturing unit comprising a plurality of operating parameters, one or more quality values, end product quality score and associated quality indicators, and one or more predefined constraints associated with the industrial manufacturing unit, wherein the plurality of operating parameters comprise a plurality of controllable parameters and a plurality of uncontrollable parameters.

Further, the processor-implemented method comprises pre-processing, via the one or more hardware processors, the received historical batch data for data sufficiency checking as well as predefined noise estimation technique, wherein the data sufficiency is an indicator of a probability of improvement on available data, and building, via one or more hardware processors, a multilayer perceptron (MLP) model based on the pre-processed historical batch data to learn a relationship among the plurality of operating parameters, the one or more quality indicator values, and end product quality score and associated quality indicators, while adhering to the one or more predefined constraint values.

Furthermore, the processor-implemented method comprises analyzing, via the one or more hardware processors, the learnt relationship among the plurality of operating parameters and the end product quality score and associated quality indicators as a maximization problem of quality, determining, via the one or more hardware processors, a minimization problem of the quality by inverting the maximization problem of quality using a gradient decent technique to achieve a global minima and selecting, via the one or more hardware processors, a predefined set of data with maximum quality to train a regression model for each of the plurality of controllable parameters, wherein the trained regression model predicts value of each controllable parameter based on the plurality of non-controllable parameters. Furthermore, the processor-implemented method comprises determining, via the one or more hardware processors, a candidate point of the minimization problem by using the values corresponding to the plurality of controllable parameters and the plurality of uncontrollable parameters, creating, via the one or more hardware processors, a soft ball of a predefined radius around a candidate key to overcome noisy data around the determined optimal starting point of the minimization problem, performing, via the one or more hardware processors, a geometric decay with a predefined decay factor for a momentum of the soft ball in the minimization problem to predict an optima, converging, via one or more hardware processors, the predicted optima to a global minima through a gradient descent through iterative optimization of the soft ball from the candidate point in the minimization problem using a cost function in terms of the quality values and the constraint values. Finally, the processor-implemented method comprises recommending, via the one or more hardware processors, the values of the plurality of controllable parameters to obtain the optimal quality to the user.

In another aspect, a system for recommending optimum configurations in industrial control systems for improving quality of product is provided. The system comprises a memory storing a plurality of instructions and one or more Input/Output (I/O) interfaces to receive a historical batch data of an industrial manufacturing unit comprising a plurality of operating parameters, one or more quality values, end product quality score and associated quality indicators, and one or more predefined constraints associated with the industrial manufacturing unit. Further, the system comprises one or more hardware processors coupled to the memory via the one or more I/O interfaces, wherein the one or more hardware processors are configured by the instructions to pre-process the received historical batch data for data sufficiency based on a predefined noise estimation technique, wherein the data sufficiency is an indicator of a probability of improvement on the available data. Further, the one or more hardware processors are configured to build a multilayer perceptron (MLP) model based on the pre-processed historical batch data to learn a relationship among the plurality of operating parameters, the one or more quality values, and end product quality score and associated quality indicators, while adhering to the one or more predefined constraint values, wherein the historical batch data is annotated with a domain specific label. Furthermore, the one or more hardware processors are configured to analyze the learnt relationship among the plurality of operating parameters and the end product quality score and associated quality indicators as a maximization problem of quality.

Further, the one or more hardware processors are configured to determine a minimization problem of the quality by converting the maximization problem of quality using a gradient decent technique to achieve a global minimum. Further, the one or more hardware processors are configured to select a predefined set of data with maximum quality to train a regression model for each of the plurality of controllable parameters, wherein the trained regression model predicts value of each controllable parameter based on the plurality of non-controllable parameters. Furthermore, the one or more hardware processors are configured to determine a candidate point of the minimization problem by using the values corresponding to the plurality of controllable parameters and the plurality of uncontrollable parameters.

Further, the one or more hardware processors are configured to create a soft ball of a predefined radius around a candidate key to overcome noisy data around the determined optimal starting point of the minimization problem, wherein a spherical gaussian distribution technique is used to simulate the created soft ball. Further, the one or more hardware processors are configured to perform a geometric decay with a predefined decay factor for a momentum of the soft ball in the minimization problem to predict an optima, wherein the predicted optima is an optimal quality for the values of the plurality of controllable parameters. Further, the one or more hardware processors are configured to converge the predicted optima to a global minima through a gradient descent through iterative optimization of the soft ball from the candidate point in the minimization problem using a cost function in terms of the quality values and the constraint values, wherein the cost function is resultant sum of a mean squared error (MSE) of negative loss function of quality score and soft plus function of defined constraints. Finally, the one or more hardware processors are configured to recommend the values of the plurality of controllable parameters to obtain the optimal quality to the user.

In yet another aspect, there are provided one or more non-transitory machine-readable information storage mediums comprising one or more instructions, which when executed by one or more hardware processors causes a method to recommend optimum configurations in industrial control systems for improving quality of product is provided. The processor-implemented method includes receiving, via an input/output interface, a historical batch data of an industrial manufacturing unit comprising a plurality of operating parameters, one or more quality values, end product quality score and associated quality indicators, and one or more predefined constraints associated with the industrial manufacturing unit, wherein the plurality of operating parameters comprise a plurality of controllable parameters and a plurality of uncontrollable parameters.

Further, the processor-implemented method comprises pre-processing, via the one or more hardware processors, the received historical batch data for data sufficiency checking as well as predefined noise estimation technique, wherein the data sufficiency is an indicator of a probability of improvement on available data, and building, via one or more hardware processors, a multilayer perceptron (MLP) model based on the pre-processed historical batch data to learn a relationship among the plurality of operating parameters, the one or more quality indicator values, and end product quality score and associated quality indicators, while adhering to the one or more predefined constraint values.

Furthermore, the processor-implemented method comprises analyzing, via the one or more hardware processors, the learnt relationship among the plurality of operating parameters and the end product quality score and associated quality indicators as a maximization problem of quality, determining, via the one or more hardware processors, a minimization problem of the quality by inverting the maximization problem of quality using a gradient decent technique to achieve a global minima and selecting, via the one or more hardware processors, a predefined set of data with maximum quality to train a regression model for each of the plurality of controllable parameters, wherein the trained regression model predicts value of each controllable parameter based on the plurality of non-controllable parameters. Furthermore, the processor-implemented method comprises determining, via the one or more hardware processors, a candidate point of the minimization problem by using the values corresponding to the plurality of controllable parameters and the plurality of uncontrollable parameters, creating, via the one or more hardware processors, a soft ball of a predefined radius around a candidate key to overcome noisy data around the determined optimal starting point of the minimization problem, performing, via the one or more hardware processors, a geometric decay with a predefined decay factor for a momentum of the soft ball in the minimization problem to predict an optima, converging, via one or more hardware processors, the predicted optima to a global minima through a gradient descent through iterative optimization of the soft ball from the candidate point in the minimization problem using a cost function in terms of the quality values and the constraint values. Finally, the processor-implemented method comprises recommending, via the one or more hardware processors, the values of the plurality of controllable parameters to obtain the optimal quality to the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
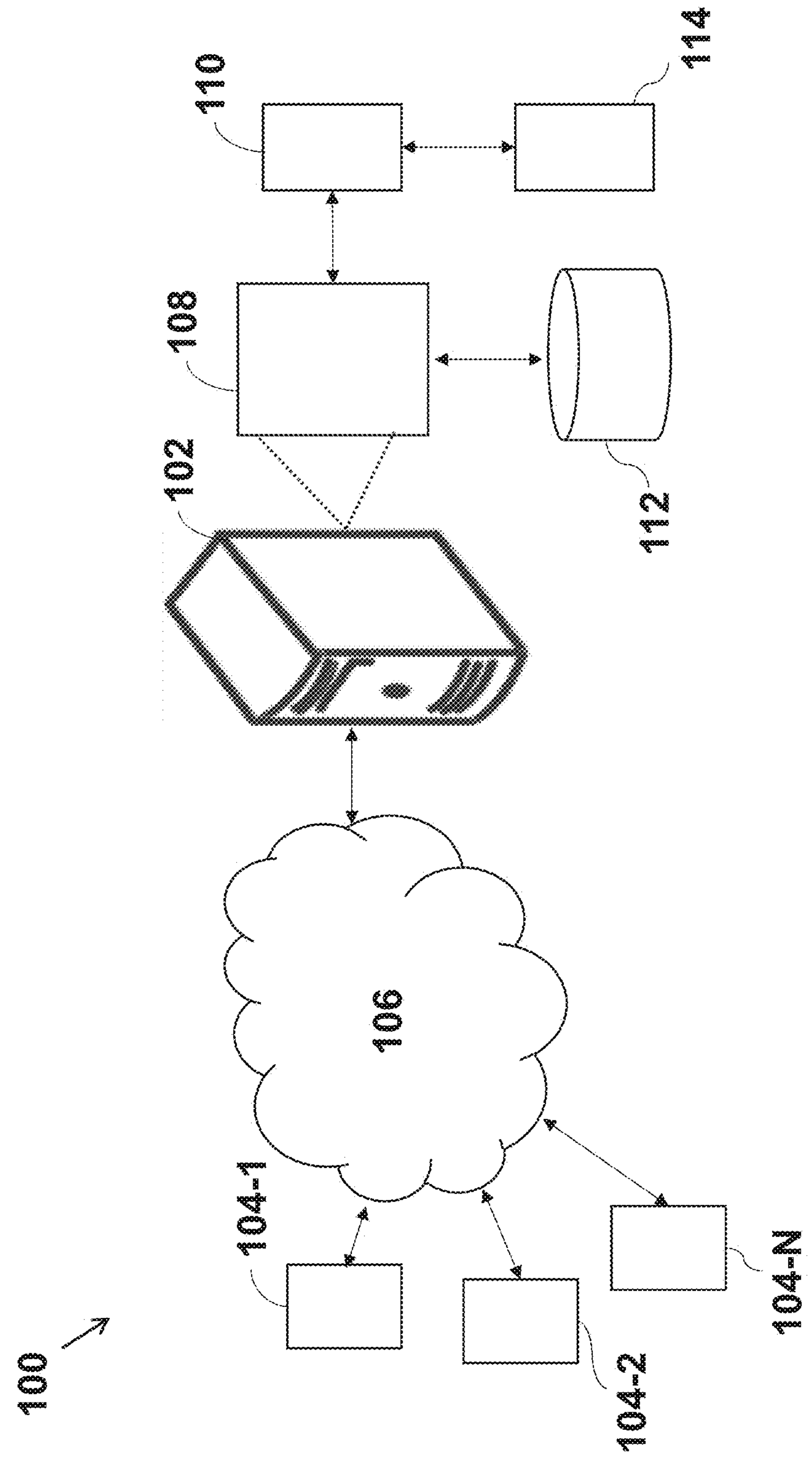
FIG. 1 illustrates an exemplary system for recommending optimum configurations in industrial control systems, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In an industrial manufacturing, very common problem is that the operating conditions (e.g., Ambient Temperature) and raw material quality of a product get changed frequently. However, even under such changing environments industries would like to improve the quality of the product beyond historically observed best without violating constraints set by a manufacturer or government. A batch that produces optimum quality of product is commonly known as the golden Batch. It is a huge challenge to improve upon or to consistently produce golden batches specially under changing environment without violating the constraints when historical data is noisy. Existing techniques either perform random experiments and find out initial settings manually or depends on domain expert to define process parameters.

Embodiments herein provide a method and system for recommending optimum configurations in industrial control systems for improving quality of product. The system is configured to automate improvement over existing golden batch with a data driven approach and replace need of random experimentation with very minimal systematic experiments. The system ensures that no constraint violations are made, and the system remains stable even when data is noisy. Further, the system recommends values of parameters so that improvement in quality is achieved. The changes in parameter value should be gradual even if the historical data received from feedback is noisy.

Referring now to the drawings, and more particularly to FIG. 1 through FIG. 7, where similar reference characters denote corresponding features consistently throughout the figures, there are shown preferred embodiments, and these embodiments are described in the context of the following exemplary system and/or method.

FIG. 1 illustrates a block diagram of a system 100 for recommending optimum configurations in industrial control systems for improving quality of product, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory to execute a plurality of modules 114 therein. The plurality of modules 114, for example, includes a multilayer perceptron module 202, and an optimization module 204. The components and functionalities of the system 100 are described further in detail.

Figure 2:
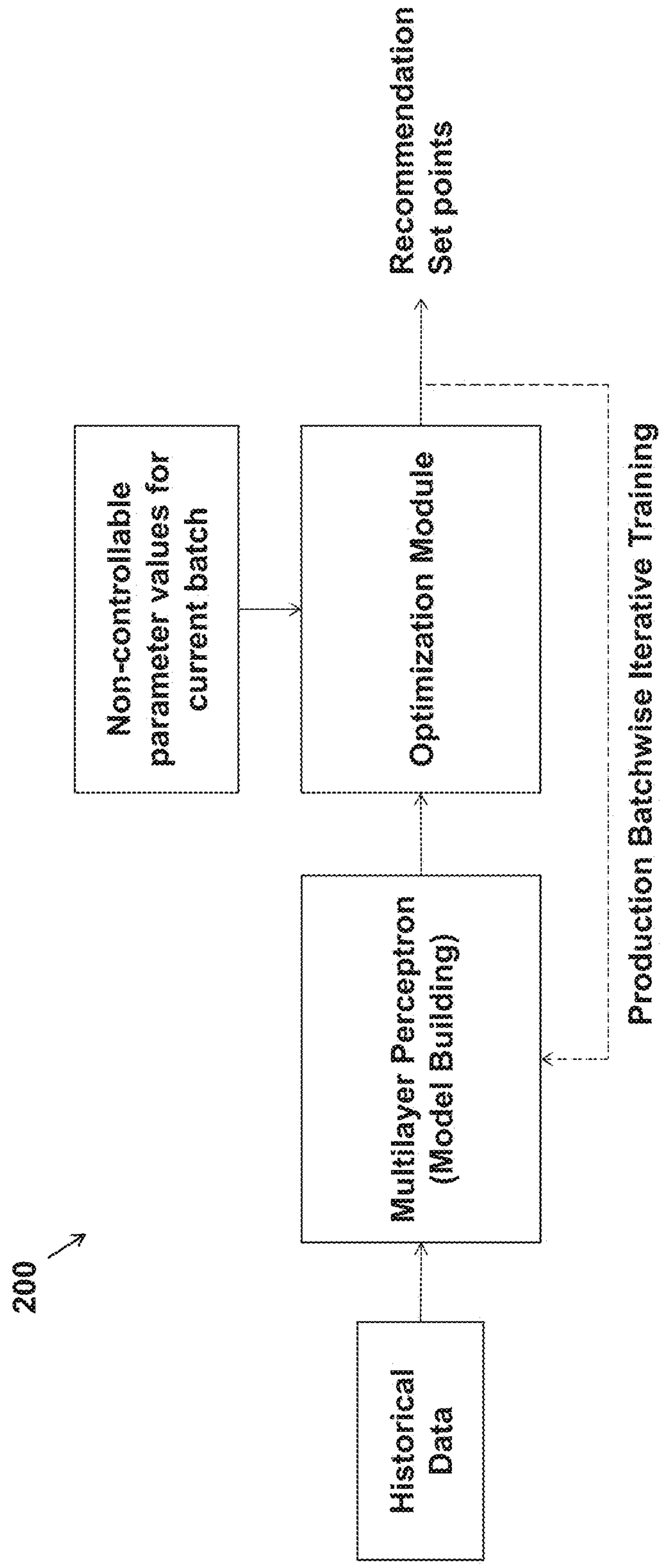
FIG. 2 is a block diagram to recommend optimum configurations in industrial control systems implemented by the system of FIG. 1, according to some embodiments of the present disclosure.

FIG. 2 is a functional block diagram of an example system 200 to recommend optimum configurations in industrial control systems implemented by the system 100 of FIG. 1, according to some embodiments of the present disclosure. It is to be noted that the recommended set points are sent to operator of plant who may override these based on his domain expertise. The actual set points for plant along with updated quality score, after next batch run, is fed back to a model building module to retrain the model.

Figure 3A:
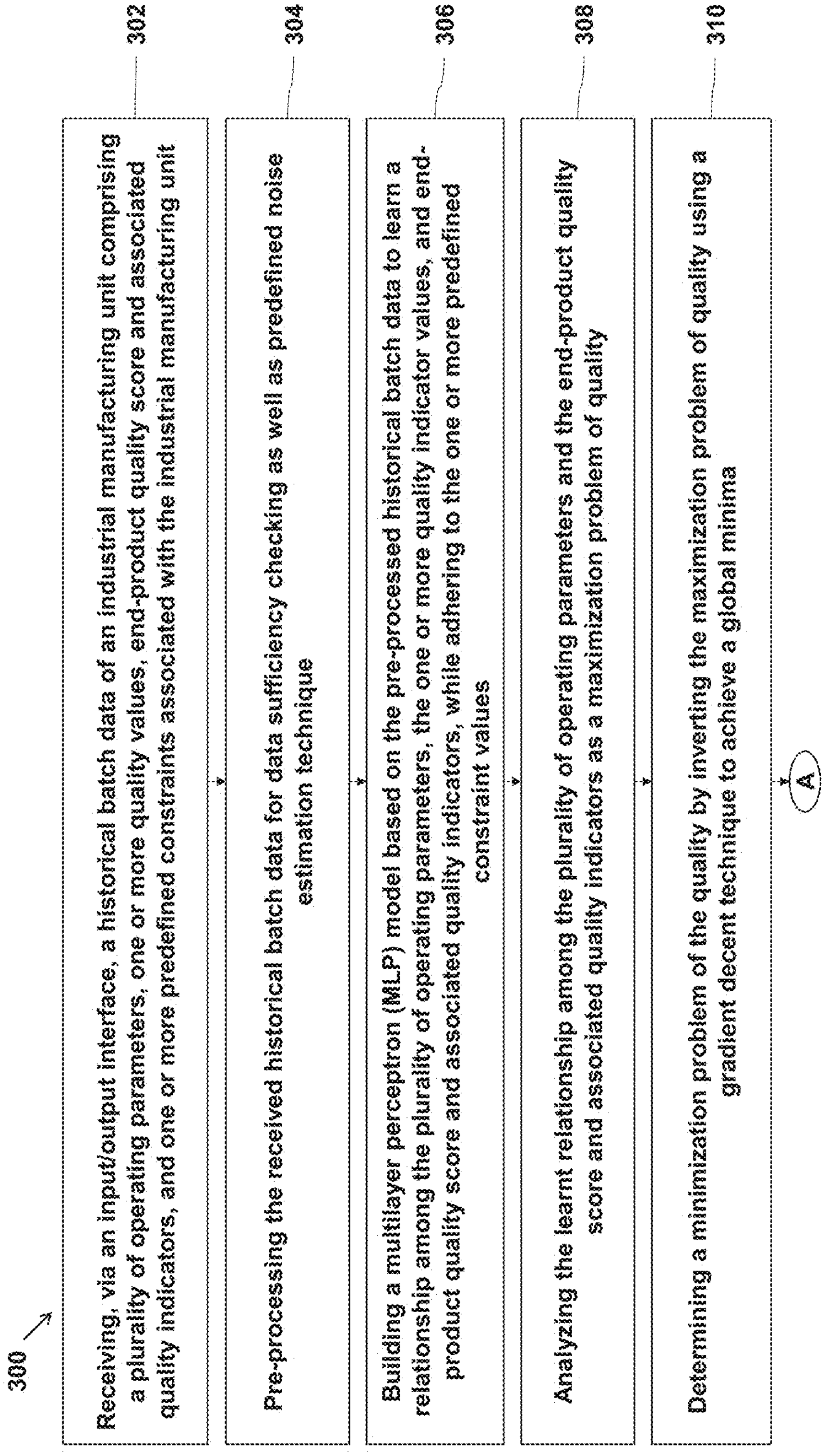
FIG. 3A and 3B (collectively referred as FIG. 3) are exemplary flow diagrams illustrating a processor-implemented method for recommending optimum configurations in industrial control systems, according to some embodiments of the present disclosure.
Figure 3B:
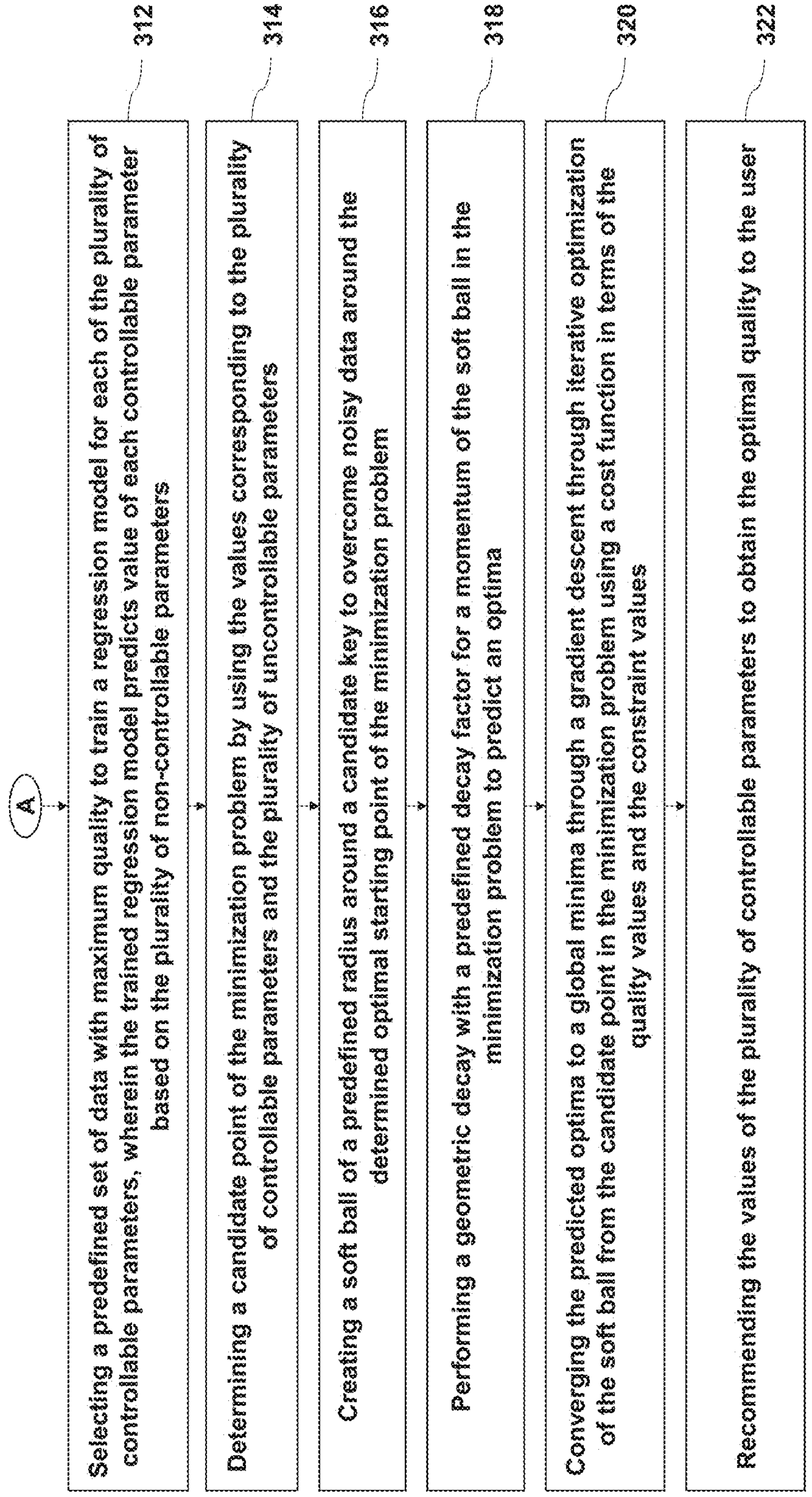

FIG. 3A and 3B (collectively referred as FIG. 3) are exemplary flow diagrams illustrating a processor-implemented method 300 for recommending optimum configurations in industrial control systems implemented by the system 100 of FIG. 1. Functions of the components of the system 100 are now explained with reference to FIG. 2 through steps of flow diagram in FIG. 3, according to some embodiments of the present disclosure.

In an embodiment, the system 100 comprises one or more data storage devices or the memory 102 operatively coupled to the processor(s) 108 and is configured to store instructions for execution of steps of the method 300 by the processor(s) or one or more hardware processors 108. The steps of the method 300 of the present disclosure will now be explained with reference to the components or blocks of the system 100 as depicted in FIGS. 1 and 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Initially, at step 302 of the processor-implemented method 300, the one or more hardware processors 108 are configured by the programmed instructions to receive, via an input/output interface 104, a historical batch data of an industrial manufacturing unit. The historical data comprising a plurality of operating parameters, one or more quality values, end product quality score and associated quality indicators, and one or more predefined constraints associated with the industrial manufacturing unit. The plurality of operating parameters comprises a plurality of controllable parameters and a plurality of uncontrollable parameters.

Figure 4A:
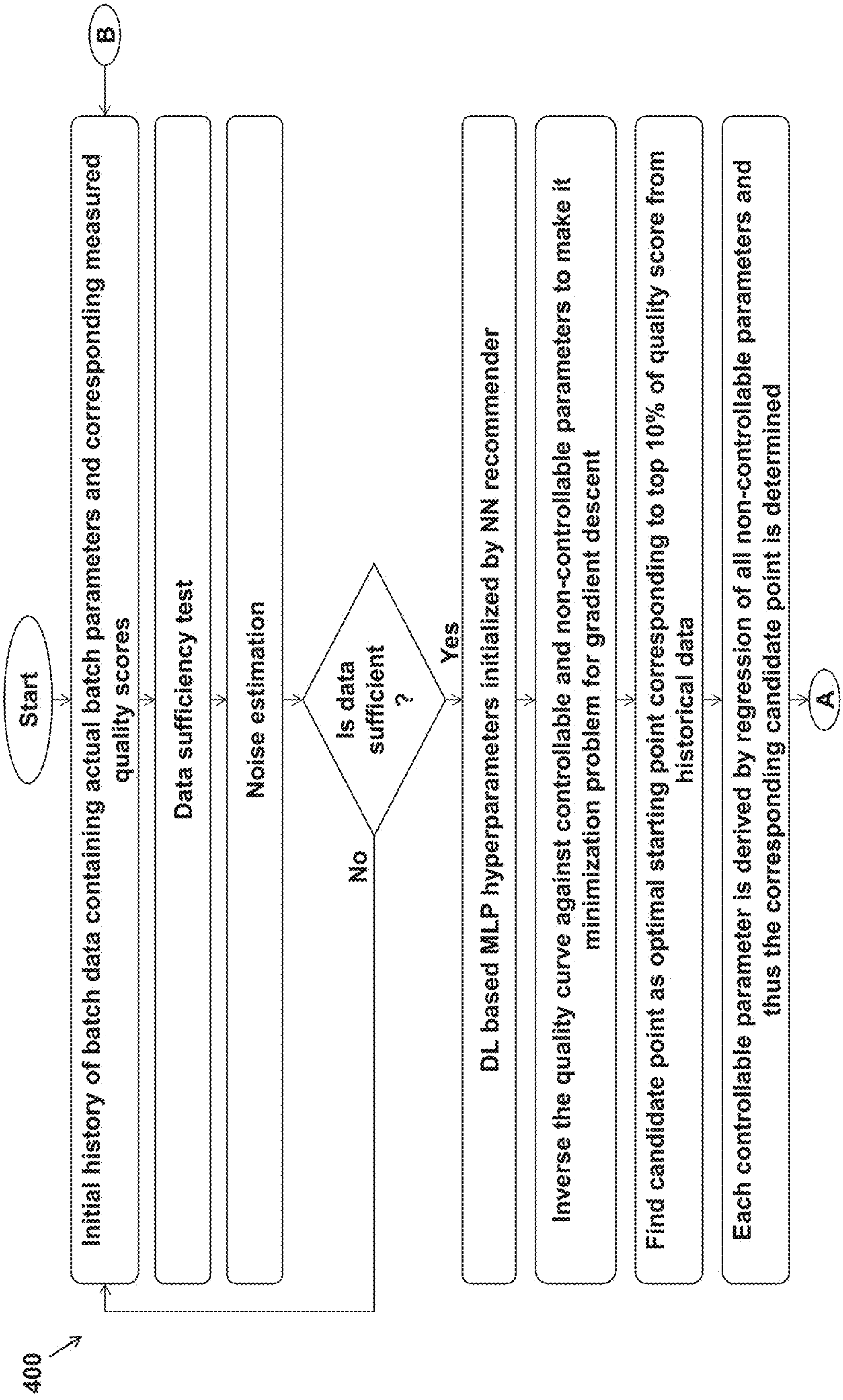
FIG. 4A and 4B (collectively referred as FIG. 4) are functional flow diagrams to illustrate steps for recommending optimum configurations in industrial control systems, according to some embodiments of the present disclosure.

At the next step 304 of the processor-implemented method 300, the one or more hardware processors 108 are configured by the programmed instructions to pre-process the received historical batch data for data sufficiency checking as well as predefined noise estimation technique. It is to be noted that the data sufficiency is an indicator of a probability of improvement on available data. State of the art data preprocessing techniques like null check and removal, duplicate row removal, data scaling, data formatting in dataset as required for numeric computation are used. Based on the given historical data points various regression lines can be drawn satisfying the given data, but the curves will have significant variations in the region of non-sufficient data points and that standard deviation with respect to the mean value becomes an indicator of data insufficiency. Noise estimation is done by checking the data points are within range of certain threshold values, set by domain experts as shown in FIG. 4A.

At the next step 306 of the processor-implemented method 300, the one or more hardware processors 108 are configured by the programmed instructions to build a multilayer perceptron (MLP) model based on the pre-processed historical batch data to learn a relationship among the plurality of operating parameters, the one or more quality indicator values, and end product quality score and associated quality indicators, while adhering to the one or more predefined constraint values. For example, in cigarette production the production area humidity is set at 65-68% RH. The tobacco starts to lose moisture and becomes dry if the humidity falls below about 60% RH. This can result in the tobacco to fall off the cigarette tip when it is held upside down. The moisture addition can result in staining on the paper if the humidity exceeds 70%, thus making it unacceptable to the end client.

At the next step 308 of the processor-implemented method 300, the one or more hardware processors 108 are configured by the programmed instructions to analyze the learnt relationship among the plurality of operating parameters and the end product quality score and associated quality indicators as a maximization problem of quality. For example, quality of Tea is often graded and rated by expert tea testers on a certain scale based on quality indicators like Liquor and Flavor. The quality indicators vary for variation of tea like Assam Tea and Darjeeling Tea.

At the next step 310 of the processor-implemented method 300, the one or more hardware processors 108 are configured by the programmed instructions to determine a minimization problem of the quality by inverting the maximization problem of quality to achieve a global minimum using a gradient decent technique.

At the next step 312 of the processor-implemented method 300, the one or more hardware processors 108 are configured by the programmed instructions to select a predefined set of data with maximum quality corresponding to top 10-15% of quality score to train a regression model for each of the plurality of controllable parameters using all the non-controllable parameters, the regression model may be generated by state of the art regression technique like Random Forest Regression. The trained regression model predicts value of each controllable parameter based on the plurality of non-controllable parameters.

Figure 4B:
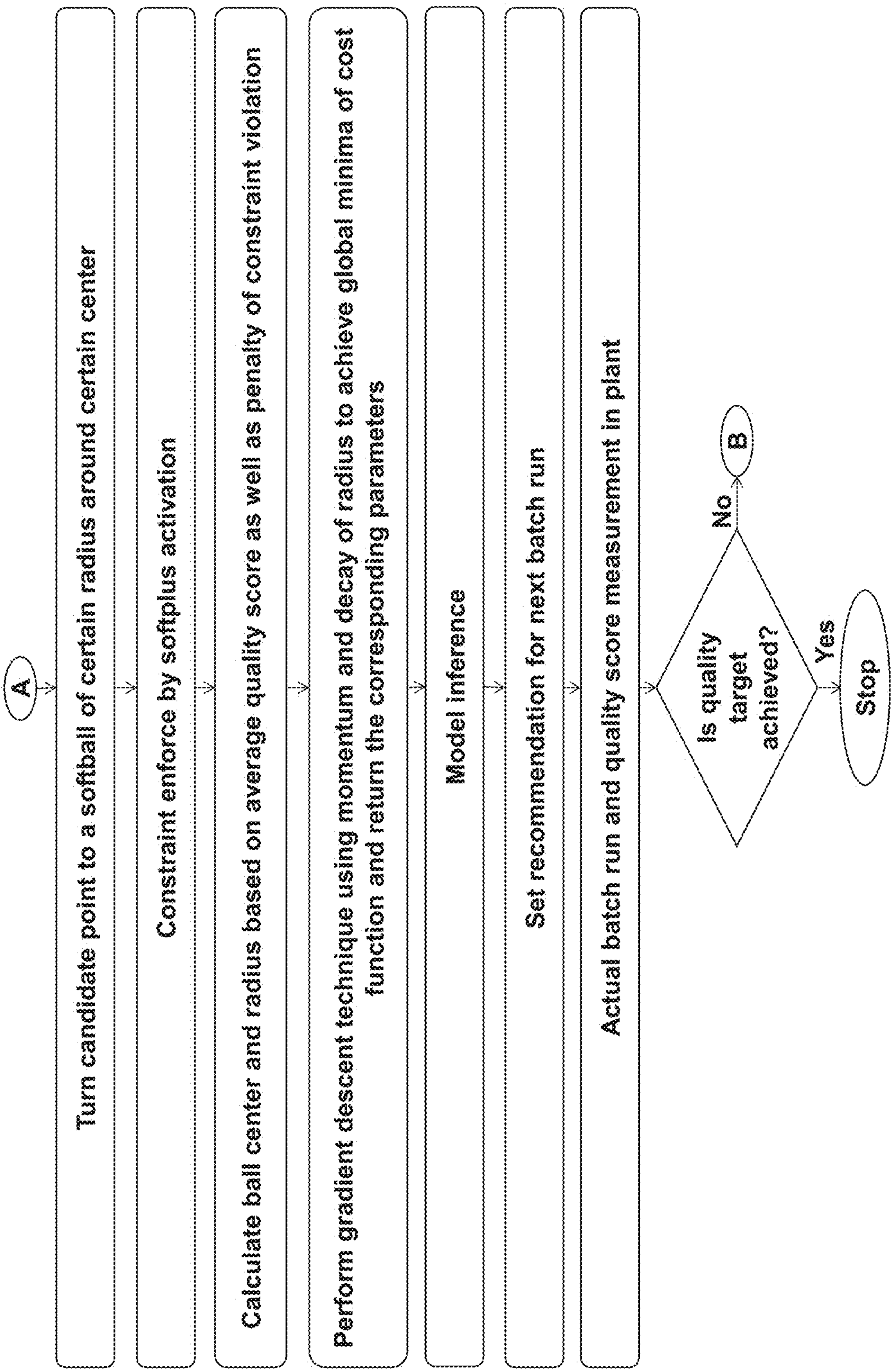

At the next step 314 of the processor-implemented method 300, the one or more hardware processors 108 are configured by the programmed instructions to determine a candidate point, as the starting point for gradient descent technique, of the minimization problem by using the values corresponding to the plurality of controllable parameters and the plurality of uncontrollable parameters. Herein, a domain specific constraint is enforced in the minimization problem while applying the momentum based iterative optimization of the soft ball from the candidate point as shown in FIG. 4B.

Figure 5:
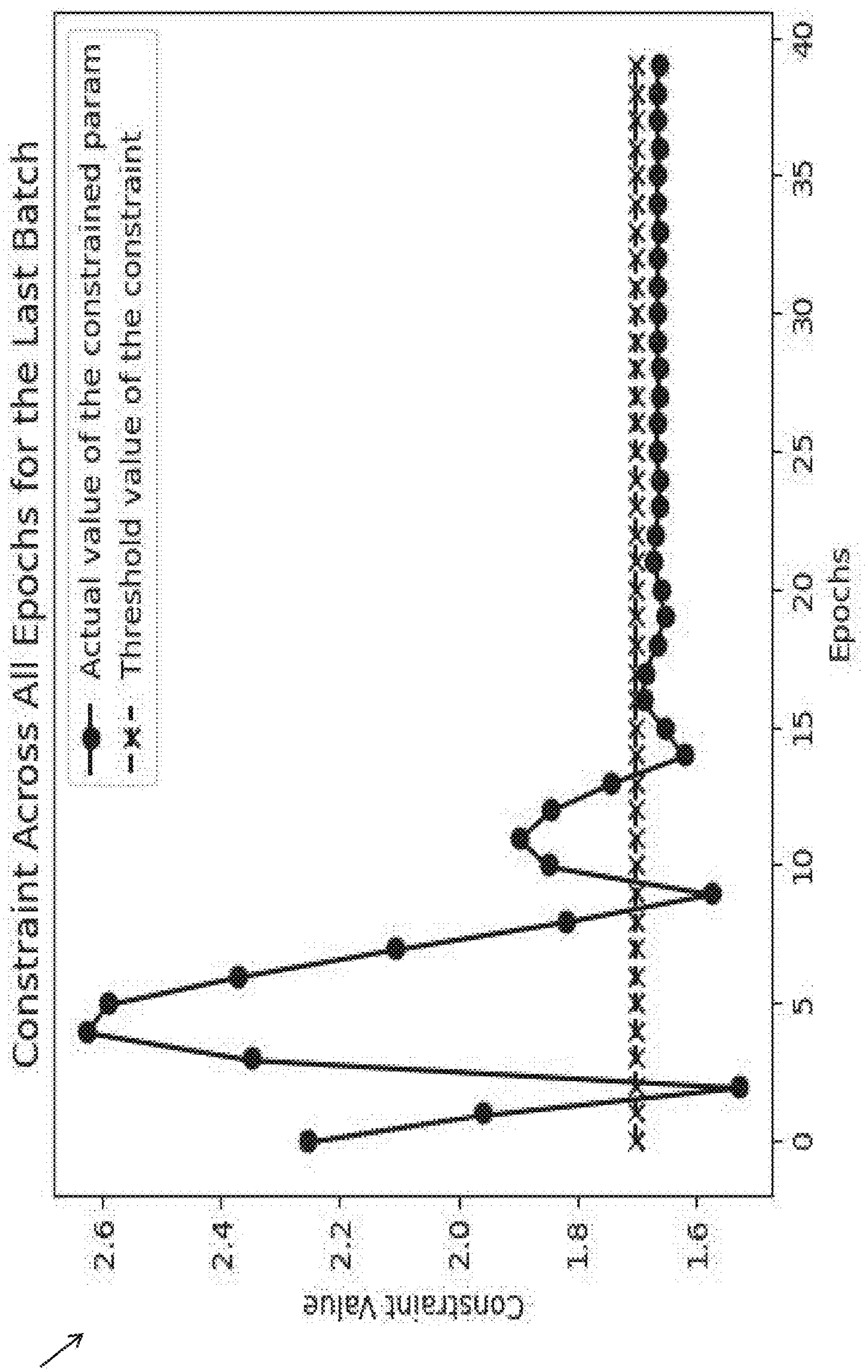
FIG. 5 is a schematic diagram to illustrate product quality score improvement over batch iterations, according to some embodiments of the present disclosure.

For example, in cigarette production the production area humidity is set at 65-68% relative humidity that is a domain specific constraint. Due to this constraint the process parameters cannot cross the threshold even if higher quality is achievable, rather the parameters need to settle within allowable range to achieve an optimum quality. Also, the constraints settle down much near to the threshold level over iterations, as per FIG. 5 showing last batch of 40 iterations, although it still violates by a narrow margin. In practice the constraints are taken more stringent so that even slight variation from recommended constraint does not impact manufacturing system.

At the next step 316 of the processor-implemented method 300, the one or more hardware processors 108 are configured by the programmed instructions to create a soft ball of a predefined radius around a candidate key to overcome noisy data around the determined optimal starting point of the minimization problem.

Figure 6:
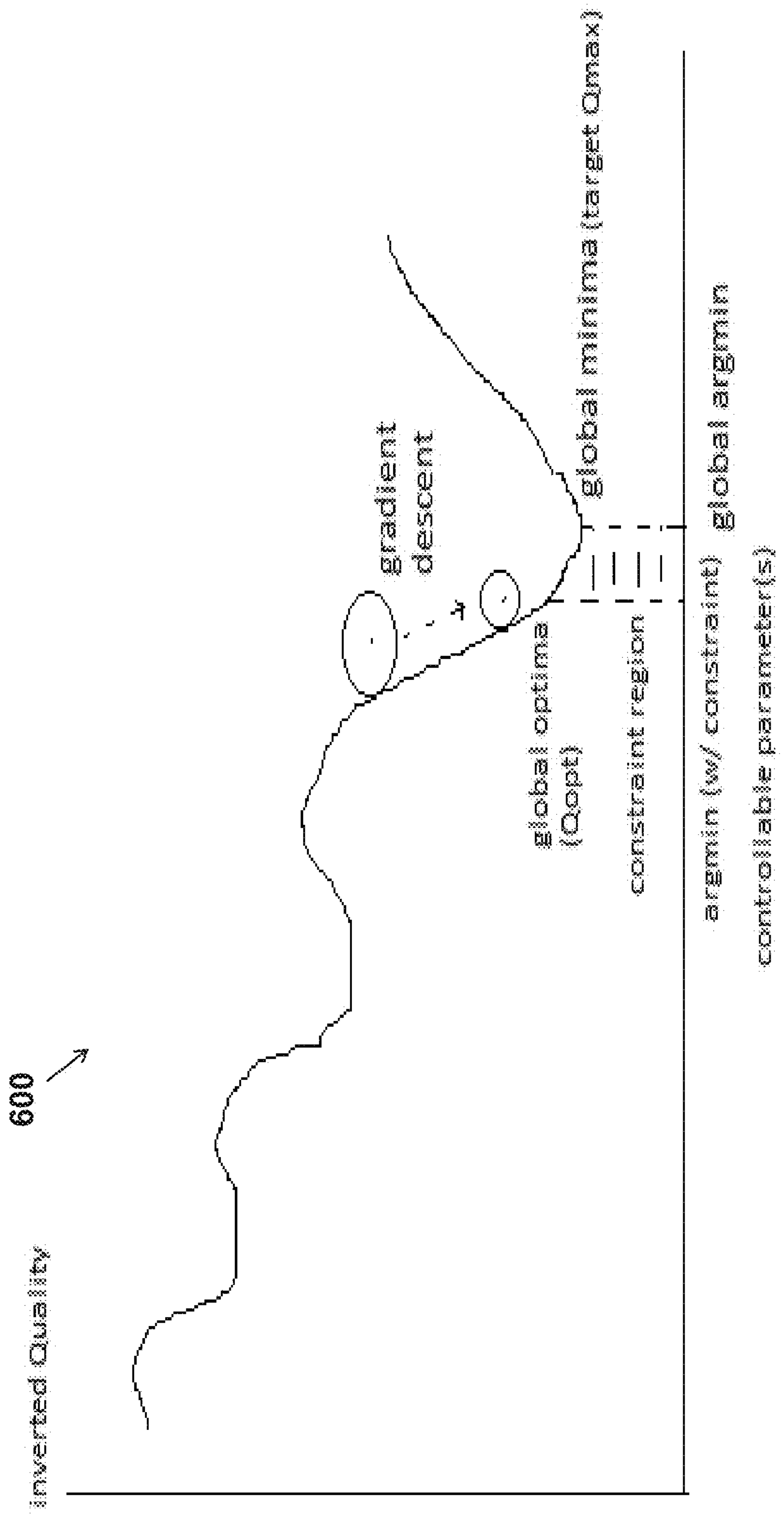
FIG. 6 is a schematic diagram to illustrate recommendation mechanism considering maximum quality without violating any constraint, according to some embodiments of the present disclosure.

FIG. 6 is a schematic diagram to illustrate recommendation mechanism considering maximum quality without violating any constraint. The ball radius is chosen such that the 99.7% of data falls within the circle (ball) with practical assumption that data points are normally (Gaussian) distributed. Larger radius would cause higher robustness to noise, but too large radius may make the improvement process unstable. It is to be noted that not only to overcome noisy data at starting candidate point, but all along the path towards global minima, in each epoch the candidates' points may evolve based on gradient descent technique based on disclosed cost function to converge to global minima. The cost function defined as:

Cost function=average negative quality at the balls surface+average (softplus (constraint threshold−value of constraints) at balls surface) (1)

wherein softplus is an activation function. The recommendation points are retrieved which correspond to the perceived optima as per following equation to minimize sum of inverted quality and cost of constraint violation:

recommendation=$^{argmin}$[average(negative quality at the ball surface)+$_{ballcenter}$average(softplus(constraint value at ball surface)] (2)

At the next step 318 of the processor-implemented method 300, the one or more hardware processors 108 are configured by the programmed instructions to perform a geometric decay with a predefined decay factor for a momentum of the soft ball in the minimization problem to predict an optima. A soft ball is created around the candidate point as a bigger ball will be able to overcome local minima and converge to global minima. Thus, the method becomes robust to uneven/non-smooth curves caused by real-life noisy data. Sample from a spherical gaussian distribution is used to simulate the ball. However, as the ball rolls down toward global maxima, the radius of the ball is decayed as a bigger ball might get stuck in opposite slope. The radius of the ball and the exponential decay factor is use case specific hyper parameters and are to be set by experimentation. There is scope to improve the recommendation model considering the next run successive batch data to retrain the original MLP or ensemble of MLPs with new data set after getting minimum number of feedbacks.

In the present disclosure, consider the initial radius of the ball as 0.1 and perform a geometric decay with decay rate of 0.01 per downward step. The momentum (existing state of the art technique) is used as a method of exploration to get better idea about the optima and to get across local minima. Using momentum with gradient descent, gradients from the past is taken care as a weighted moving average to push the cost further to move around a saddle point, thus reaching the global minima eventually.

Figure 7:
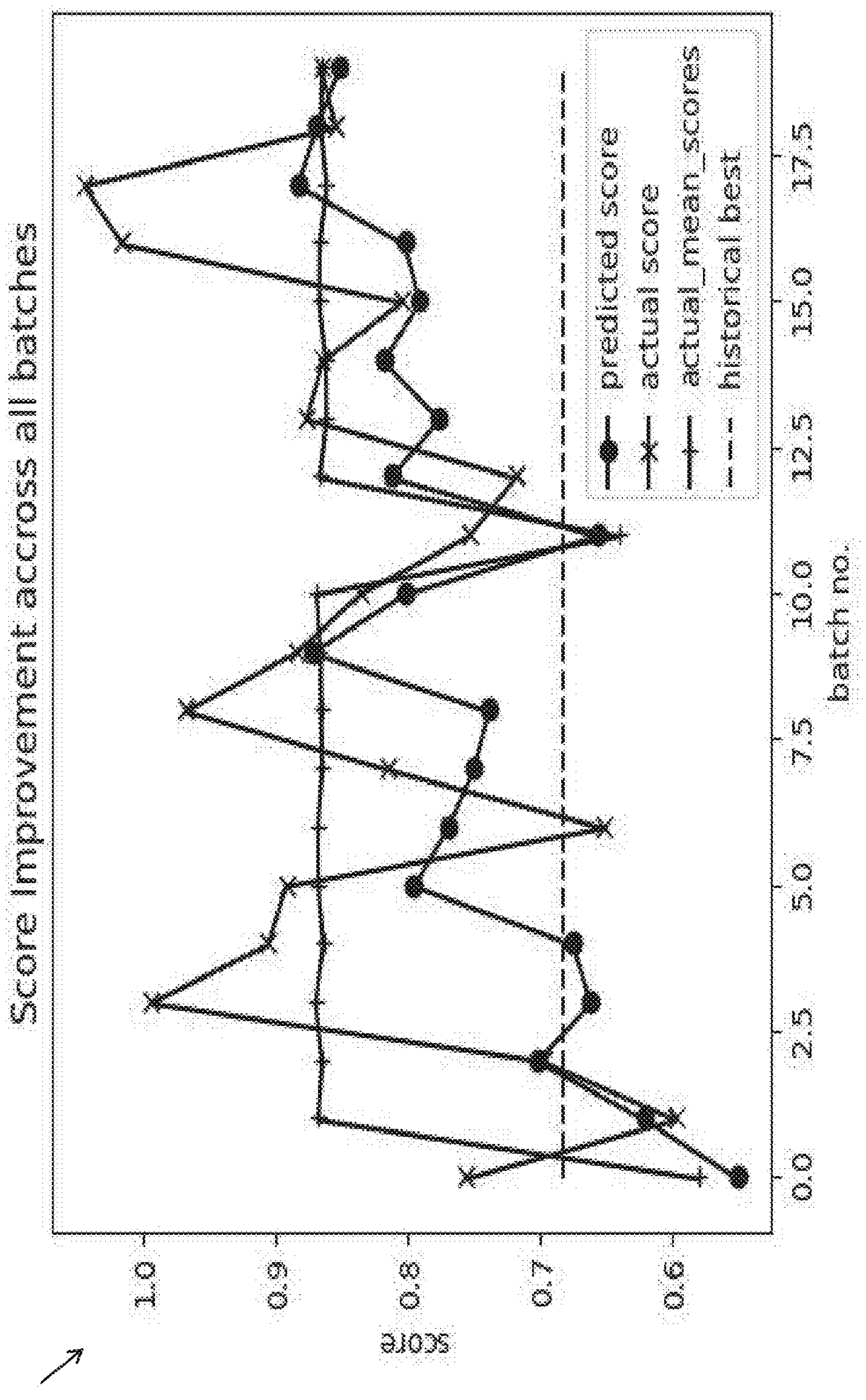
FIG. 7 is a schematic diagram to illustrate relationship of constraints to the threshold level over iterations, according to some embodiments of the present disclosure.

At the next step 320 of the processor-implemented method 300, the one or more hardware processors 108 are configured by the programmed instructions to converge the predicted optima to a global minima through a gradient descent through iterative optimization of the soft ball from the candidate point in the minimization problem using a cost function in terms of the quality values and the constraint values as shown in FIG. 7.

Finally, at the last step 322 of the processor-implemented method 300, the one or more hardware processors 108 are configured by the programmed instructions to recommend the values of the plurality of controllable parameters to obtain the optimal quality to the user.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of getting optimum quality of product while changing operating conditions and raw material frequently in an industrial manufacturing process. Embodiments herein provide a method and system for recommending optimum configurations in industrial control systems for improving quality of product. The system is configured to automate improvement over existing golden batch with a data driven approach and replace need of random experimentation with very minimal systematic experiments. The system ensures that no constraint violations are made, and the system remains stable even when data is noisy. Further, the system recommends values of parameters so that improvement in quality is achieved. The changes in parameter value should be gradual even if the historical data received from feedback is noisy.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via an input/output interface, a historical batch data of an industrial manufacturing unit comprising a plurality of operating parameters, one or more quality values, end product quality score and associated quality indicators, and one or more predefined constraints associated with the industrial manufacturing unit, wherein the plurality of operating parameters comprise a plurality of controllable parameters and a plurality of uncontrollable parameters;

pre-processing, via one or more hardware processors, the received historical batch data for data sufficiency check and noise estimation, wherein the data sufficiency is an indicator of a probability of improvement on available data;

building, via the one or more hardware processors, a multilayer perceptron (MLP) model based on the pre-processed historical batch data to learn a relationship among the plurality of operating parameters, the one or more quality indicator values, and end product quality score and associated quality indicators, while adhering to the one or more predefined constraint values;

analyzing, via the one or more hardware processors, the learnt relationship among the plurality of operating parameters and the end product quality score and associated quality indicators as a maximization problem of a quality;

determining, via the one or more hardware processors, a minimization problem of the quality by inverting the maximization problem of the quality using a gradient decent technique to achieve a global minima;

selecting, via the one or more hardware processors, a predefined set of data with maximum quality to train a regression model for each of the plurality of controllable parameters, wherein the trained regression model predicts value of each controllable parameter based on the plurality of non-controllable parameters;

determining, via the one or more hardware processors, a candidate point of the minimization problem by using the values corresponding to the plurality of controllable parameters and the plurality of uncontrollable parameters;

creating, via the one or more hardware processors, a soft ball of a predefined radius around a candidate key to overcome noisy data around the determined optimal starting point of the minimization problem and to overcome a local minima and converge to a global minima;

performing, via the one or more hardware processors, a geometric decay with a predefined decay factor for a momentum of the soft ball in the minimization problem to predict an optima;

converging, via the one or more hardware processors, the predicted optima to the global minima through a gradient descent through iterative optimization of the soft ball from the candidate point in the minimization problem using a cost function in terms of the quality values and the constraint values;

recommending, via the one or more hardware processors, the values of the plurality of controllable parameters to obtain the optimal quality from the industrial manufacturing unit;

sending, via the one or more hardware processors, the recommended values of the plurality of controllable parameters as set points for the industrial manufacturing unit, to an operator of the industrial manufacturing unit for a next batch run;

receiving after the next batch run, via the one or more hardware processors, actual set points for the industrial manufacturing unit along with an updated quality score; and retraining, via the one or more hardware processors, the MLP model based on the received actual set points and the updated quality score fed back as a new data set after getting a minimum number of feedbacks, thereby improving the MLP model.

2. The processor-implemented method of claim 1, wherein domain specific constraint is enforced in the minimization problem while applying the momentum based iterative optimization of the soft ball from the candidate point.

3. The processor-implemented method of claim 1, wherein the historical batch data is annotated with a domain specific labels.

4. The processor-implemented method of claim 1, wherein a spherical gaussian distribution technique is used to simulate the created soft ball.

5. The processor-implemented method of claim 1, wherein the predicted optima is an optimal quality for the values of the plurality of controllable parameters.

6. The processor-implemented method of claim 1, wherein the cost function is resultant sum of a mean squared error (MSE) of negative loss function of quality score and soft plus function of defined constraints.

7. A system comprising:

an input/output interface, to receive a historical batch data of an industrial manufacturing unit comprising a plurality of operating parameters, one or more quality values, end product quality score and associated quality indicators, and one or more predefined constraints associated with the industrial manufacturing unit;

a memory in communication with the one or more hardware processors, wherein the one or more hardware processors are configured to execute programmed instructions stored in the memory to:

pre-process the received historical batch data for data sufficiency check and noise estimation, wherein the data sufficiency is an indicator of a probability of improvement on the available data;

build a multilayer perceptron (MLP) model based on the pre-processed historical batch data to learn a relationship among the plurality of operating parameters, the one or more quality values, and end product quality score and associated quality indicators, while adhering to the one or more predefined constraint values, wherein the historical batch data is annotated with a domain specific label;

analyze the learnt relationship among the plurality of operating parameters and the end product quality score and associated quality indicators as a maximization problem of a quality; determine a minimization problem of the quality by converting the maximization problem of quality using a gradient decent technique to achieve a global minima;

select a predefined set of data with maximum quality to train a regression model for each of the plurality of controllable parameters, wherein the trained regression model predicts value of each controllable parameter based on the plurality of non-controllable parameters;

determine a candidate point of the minimization problem by using the values corresponding to the plurality of controllable parameters and the plurality of uncontrollable parameters;

create a soft ball of a predefined radius around a candidate key to overcome noisy data around the determined optimal starting point of the minimization problem and to overcome a local minima and converge to a global minima, wherein a spherical gaussian distribution technique is used to simulate the created soft ball;

perform a geometric decay with a predefined decay factor for a momentum of the soft ball in the minimization problem to predict an optima, wherein the predicted optima is an optimal quality for the values of the plurality of controllable parameters;

converge the predicted optima to the global minima through a gradient descent through iterative optimization of the soft ball from the candidate point in the minimization problem using a cost function in terms of the quality values and the constraint values, wherein the cost function is resultant sum of a mean squared error (MSE) of negative loss function of quality score and soft plus function of defined constraints;

recommend the values of the plurality of controllable parameters to obtain the optimal quality from the industrial manufacturing unit;

send the recommended values of the plurality of controllable parameters as set points for the industrial manufacturing unit, to an operator of the industrial manufacturing unit for a next batch run;

receive after the next batch run actual set points for the industrial manufacturing unit along with an updated quality score; and retrain the MLP model based on the received actual set points and the updated quality score fed back as a new data set after getting a minimum number of feedbacks, thereby improving the MLP model.

8. The system of claim 7, wherein a domain specific constraint is enforced in the minimization problem while applying the momentum based iterative optimization of the soft ball from the candidate point.

9. The system of claim 7, wherein the historical batch data is annotated with a domain specific labels.

10. The system of claim 7, wherein a spherical gaussian distribution technique is used to simulate the created soft ball.

11. The system of claim 7, wherein the predicted optima is an optimal quality for the values of the plurality of controllable parameters.

12. The system of claim 7, wherein the cost function is resultant sum of a Mean Squared Error (MSE) of negative loss function of quality score and soft plus function of defined constraints.

13. One or more non-transitory machine-readable information storage mediums comprising one or more instructions which when executed by one or more hardware processors cause:

receiving, via an input/output interface, a historical batch data of an industrial manufacturing unit comprising a plurality of operating parameters, one or more quality values, end product quality score and associated quality indicators, and one or more predefined constraints associated with the industrial manufacturing unit, wherein the plurality of operating parameters comprise a plurality of controllable parameters and a plurality of uncontrollable parameters;

pre-processing, via one or more hardware processors, the received historical batch data for data sufficiency check and noise estimation, wherein the data sufficiency is an indicator of a probability of improvement on available data;

building, via the one or more hardware processors, a multilayer perceptron (MLP) model based on the pre-processed historical batch data to learn a relationship among the plurality of operating parameters, the one or more quality indicator values, and end product quality score and associated quality indicators, while adhering to the one or more predefined constraint values;

analyzing, via the one or more hardware processors, the learnt relationship among the plurality of operating parameters and the end product quality score and associated quality indicators as a maximization problem of a quality;

determining, via the one or more hardware processors, a minimization problem of the quality by inverting the maximization problem of the quality using a gradient decent technique to achieve a global minima;

selecting, via the one or more hardware processors, a predefined set of data with maximum quality to train a regression model for each of the plurality of controllable parameters, wherein the trained regression model predicts value of each controllable parameter based on the plurality of non-controllable parameters;

determining, via the one or more hardware processors, a candidate point of the minimization problem by using the values corresponding to the plurality of controllable parameters and the plurality of uncontrollable parameters;

creating, via the one or more hardware processors, a soft ball of a predefined radius around a candidate key to overcome noisy data around the determined optimal starting point of the minimization problem and to overcome a local minima and converge to a global minima;

performing, via the one or more hardware processors, a geometric decay with a predefined decay factor for a momentum of the soft ball in the minimization problem to predict an optima;

converging, via the one or more hardware processors, the predicted optima to the global minima through a gradient descent through iterative optimization of the soft ball from the candidate point in the minimization problem using a cost function in terms of the quality values and the constraint values;

recommending, via the one or more hardware processors, the values of the plurality of controllable parameters to obtain the optimal quality from the industrial manufacturing unit;

sending, via the one or more hardware processors, the recommended values of the plurality of controllable parameters as set points for the industrial manufacturing unit, to an operator of the industrial manufacturing unit for a next batch run;

receiving after the next batch run, via the one or more hardware processors, actual set points for the industrial manufacturing unit along with an updated quality score; and retraining, via the one or more hardware processors, the MLP model based on the received actual set points and the updated quality score fed back as a new data set after getting a minimum number of feedbacks, thereby improving the MLP model.

14. The one or more non-transitory machine-readable information storage mediums of claim 13, wherein domain specific constraint is enforced in the minimization problem while applying the momentum based iterative optimization of the soft ball from the candidate point.

15. The one or more non-transitory machine-readable information storage mediums of claim 13, wherein a spherical gaussian distribution technique is used to simulate the created soft ball.

* * * * *